United States Patent [19]

Terzian

[11] Patent Number: 4,901,362
[45] Date of Patent: Feb. 13, 1990

[54] METHOD OF RECOGNIZING PATTERNS

[75] Inventor: John Terzian, Winchester, Mass.

[73] Assignee: Raytheon Company, Lexington, Mass.

[21] Appl. No.: 229,395

[22] Filed: Aug. 8, 1988

[51] Int. Cl.$^4$ .............................................. G06K 9/50
[52] U.S. Cl. ......................................... 382/22; 382/1; 382/34
[58] Field of Search ....................... 382/19, 21, 22, 16, 382/28, 20, 23, 26, 1, 34

[56] References Cited

U.S. PATENT DOCUMENTS

| | | | |
|---|---|---|---|
| 2,838,602 | 6/1958 | Sprick | 382/18 |
| 3,050,711 | 2/1959 | Harmon | 382/26 |
| 3,112,468 | 11/1963 | Kamentsky | 382/23 |
| 3,710,323 | 1/1973 | Andrews et al. | 382/47 |
| 4,119,946 | 10/1978 | Taylor | 382/34 |
| 4,361,830 | 11/1982 | Hanma et al. | 382/22 |
| 4,503,557 | 3/1985 | Maeda | 382/34 |
| 4,651,289 | 3/1987 | Maeda et al. | 364/513.5 |
| 4,672,678 | 6/1987 | Koezuka et al. | 382/30 |

OTHER PUBLICATIONS

"Digital Image Processing"; William K. Pratt; Univ. of So. Calif.; pp. 332-326 pp. 542-545; 1978.

Primary Examiner—Leo H. Boudreau
Assistant Examiner—Michael Cammarata
Attorney, Agent, or Firm—Edmund J. Walsh; Richard M. Sharkansky

[57] ABSTRACT

A method of identifying an object from a digitized image is disclosed. One embodiment of the method is particularly applicable to the classification of ships and a second embodiment is particularly applicable to the classification of aircraft. The digitized image of an unknown object is represented as a set of vertical vectors or, in the second embodiment, a set of radial vectors. The vectors are normalized and then compared to a library containing normalized digitized images of known objects. The unknown object is thereby identified as being similar to the known object corresponding to the library image most closely matching the image of the unknown object.

4 Claims, 5 Drawing Sheets

METHOD OF RECOGNIZING PATTERNS

CROSS-REFERENCE TO RELATED APPLICATIONS

Vertical Vector Pattern Recognition Algorithm, Ser. No. 102,980, filed Sept. 30, 1987, Inventor John Terzian; and Library Image Optimization, Ser. No. 103,099, filed Sept. 30, 1987, Inventor John Terzian.

BACKGROUND OF THE INVENTION

This invention pertains generally to pattern recognition, and in particular to a method of classifying objects by matching the silhouette of an unknown object to the silhouette of a known object.

Object recognition may be performed using any distinctive characteristic of the object. One such characteristic useful in many cases is the silhouette of the object as recorded by a device sensitive to visible light or infrared radiation. If the silhouette of an unknown object can be matched to the silhouette of a previously identified object, it may be concluded that the unidentified object is of the same class as the known object. Since the silhouettes are equivalent to two-dimensional patterns, any known pattern-matching technique may be used.

In one known technique, the silhouettes are divided into small elements, or "pixels." The known and unknown silhouettes are deemed to be matched if the contents of a predetermined percentage of corresponding pixels are the same. The technique being discussed, though computationally simple, performs poorly if the silhouettes being compared are not in registration one with the other. The technique also performs poorly if the image of the unknown object is a different size than that of the image of the known object (as might be the case if the images were made by devices different distances from the object). Another technique, which involves comparing two-dimensional Fourier transforms of a known image with the transform of an unknown image, operates well even if the known and unknown silhouettes are oriented differently. However, such a technique requires substantially more computation.

SUMMARY OF THE INVENTION

It is a purpose of this invention to provide a means for classifying objects by matching an image containing the silhouette of an unknown object to an image containing the silhouette of a known object.

It is a further purpose of this invention to provide an object classification technique which is computationally simple, yet robust enough to operate effectively when the silhouettes are not precisely registered or differ in size.

The foregoing and other purposes of the invention may be achieved by a process comprising the steps of creating a silhouette of an unknown object from a digitized picture, normalizing the silhouette of the unknown object to a form for comparison with reference silhouettes of known similarly normalized objects and comparing the normalized image of the unknown object to a normalized reference.

BRIEF DESCRIPTION OF THE DRAWINGS

The invention will be more fully understood from the following more detailed description when taken in conjunction with the accompanying drawings in which.

DESCRIPTION OF THE PREFERRED EMBODIMENT

Pattern recognition techniques have numerous applications. For purposes of describing the present invention, the patterns are herein depicted as representing images containing silhouettes of ships or airplanes. One skilled in the art will recognize that the source of the patterns is illustrative only and the present invention operates regardless of particular types of patterns being recognized.

Figure 1:
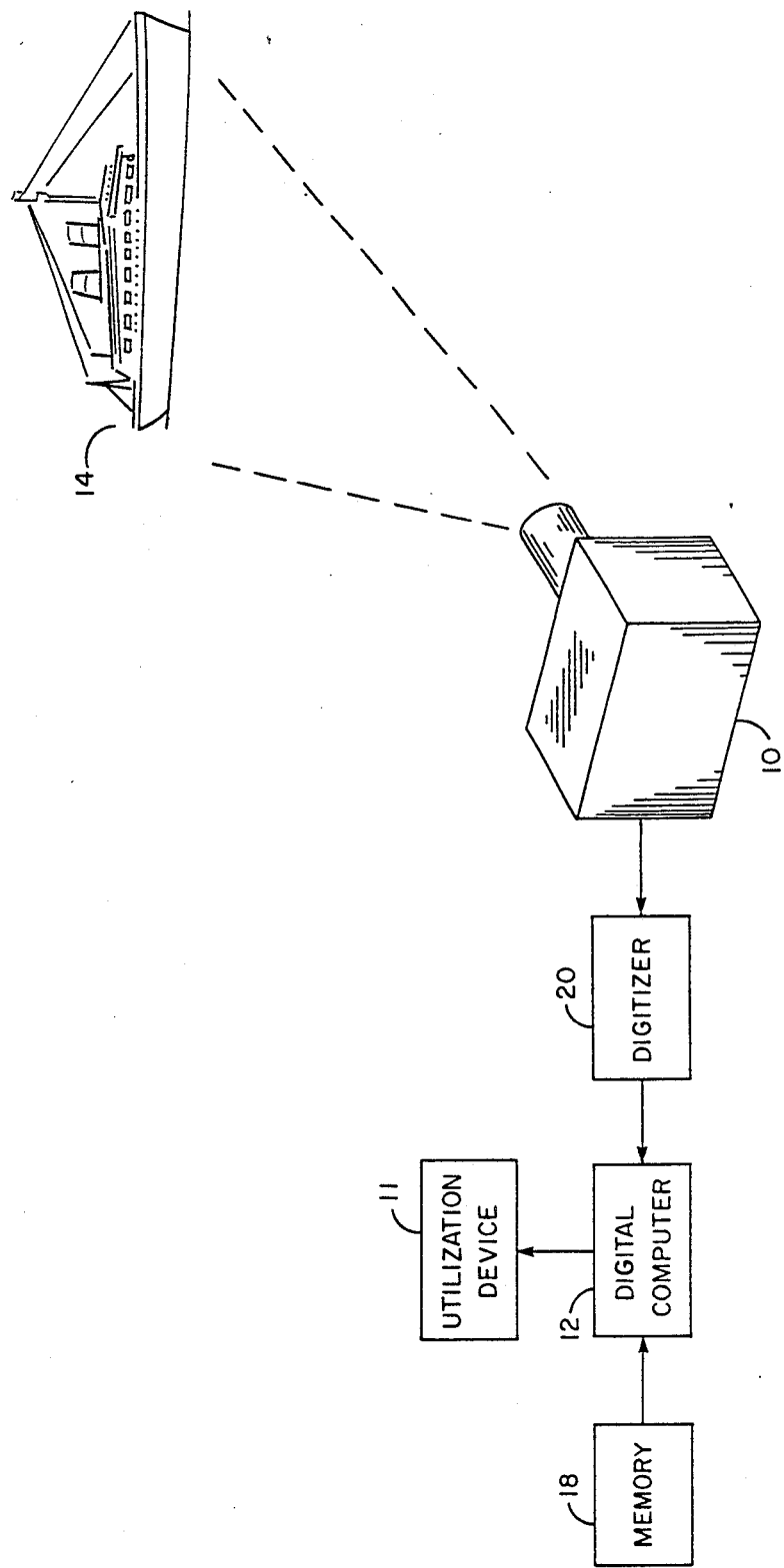
FIG. 1 is a sketch useful in understanding a system in which the invention might be employed.

Referring now to FIG. 1, an imaging device 10 is shown focussed on an unknown ship 14. The imaging device 10 may be any known device for forming an image using visible light or infrared radiation. The image of the unknown ship 14 is digitized by a digitizer 20. The digitized image is transferred to digital computer 12 wherein processing is accomplished according to the method shown in FIG. 2 and described below. As part of that processing, the digitized image is compared to silhouettes of known ships stored in memory 18. The results of the comparisons are sent to a utilization device 11 such as a cathode ray tube (CRT), allowing a human operator to read the results. The imaging device 10, the image digitizer 20, the digital computer 12, and memory 18 could be any devices known in the art for obtaining and processing digitized images.

Figure 2:
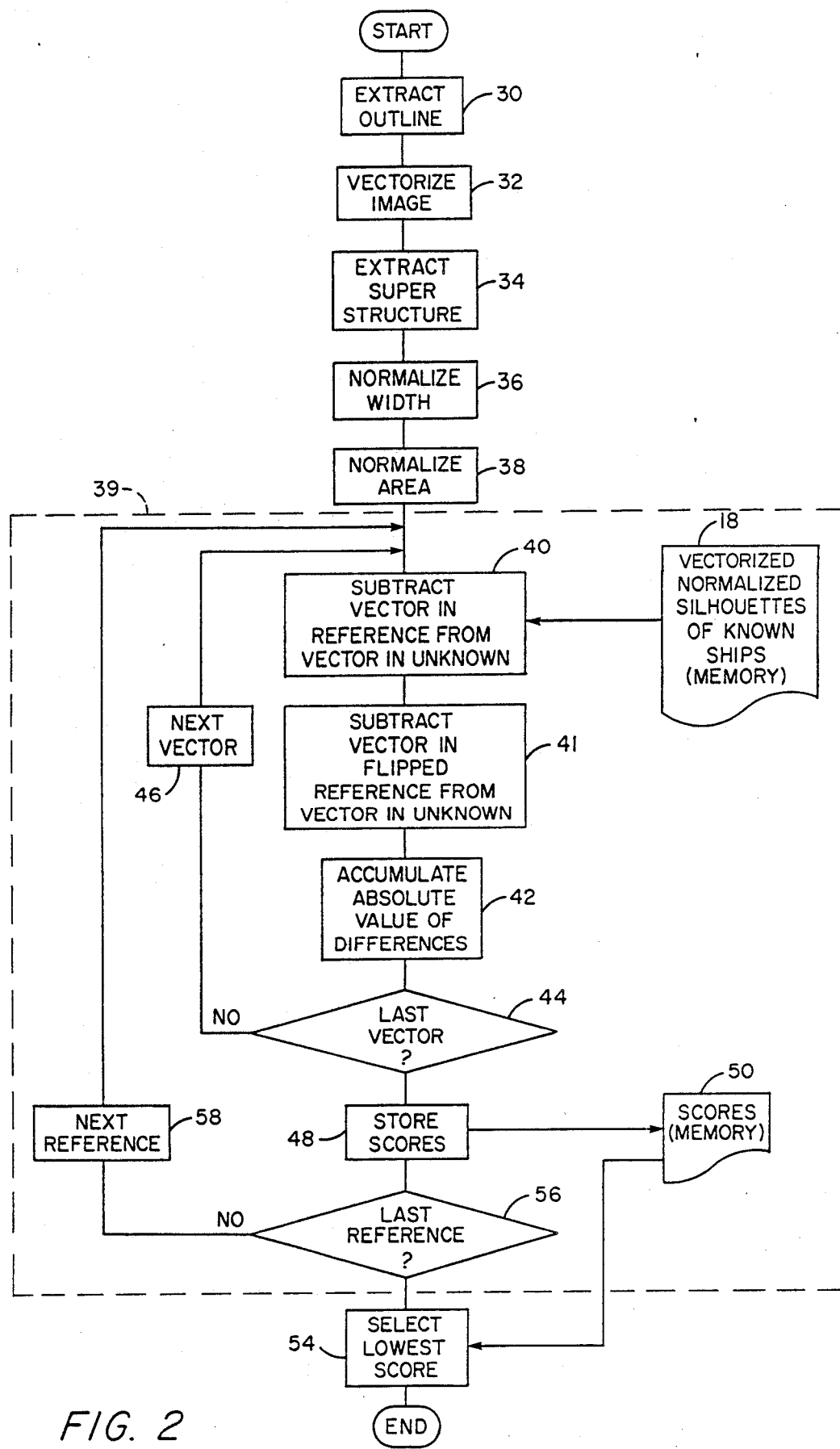
FIG. 2 is a flow chart of the contemplated object identification process.

Referring now to FIG. 2, it should be noted that the processing in FIG. 2 here is implemented by programming a general purpose digital computer such as a VAX 11/780 manufactured by Digital Equipment Corporation, Maynard, Mass. The rectangular elements in the flow diagram of FIG. 2, typified by element 30 and hereinafter denoted as "processing blocks," represent a single instruction or group of computer software instructions for the general purpose digital computer 12 (FIG. 1) to execute. The diamond-shaped elements typified by element 44 and hereinafter denoted "decision blocks," represent groups of computer software instructions which evaluate some condition and effect the order of execution of the processing blocks of the condition. The elements with curved bottoms, typified by memory 18, represent information stored in hardware memory accessible by the general purpose digital computer 12 (FIG. 1). Memory is only shown explicitly where large amounts of information are stored. The usages of memory common to most computer software programs, such as the storage of program variables, are not explicitly shown. It will be noted by one skilled in the art that initialization of variables and loops (and other standard elements of computer software programs) is not explicitly shown.

At processing block 30 the silhouette of the unknown ship 14 (FIG. 1) is extracted according to any known algorithm, or combination of algorithms. For example, the algorithm for edge enhancement described at pages 322 to 326 of *Digital Image Processing* by William K. Pratt, published by John Wiley & Sons, Inc., 1978 and the algorithms for edge segmentation described at pp. 542-545 of the same reference may be used. However, one skilled in the art will recognize that any other algorithms could be used to extract the silhouette of the unknown ship 14 (FIG. 1).

Figure 3:
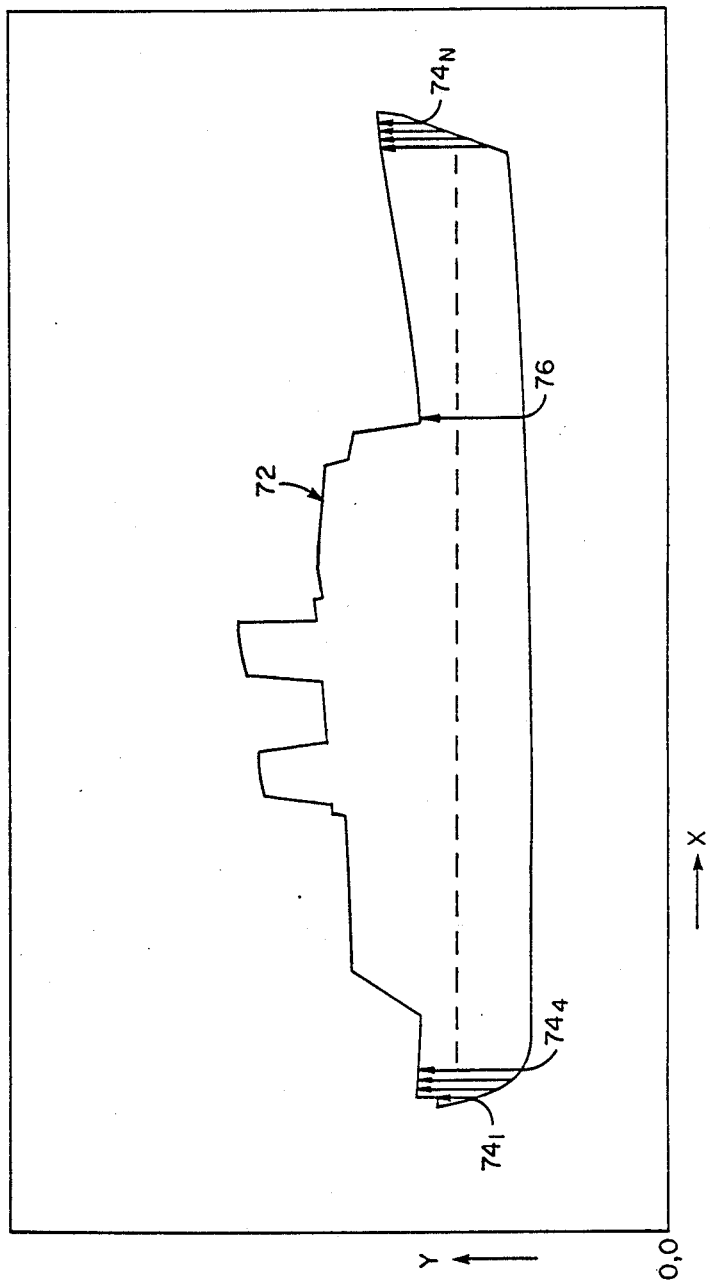
FIG. 3 is a sketch useful in understanding how an image is represented by vertical vectors.

At processing block 32 the silhouette is vectorized to form a set of vertical vectors 74, as shown in FIG. 3. FIG. 3 shows exemplary ones of a set of N vertical vectors 74 which describe the silhouette 72 of the unknown ship 14 (FIG. 1) in a field of view. Each vertical vector 74 is described by a pair of numbers representing an X and a Y value. As can be seen in FIG. 3, the vertical vectors 74 extend from the bottom to the top of the silhouette 72. It should be noted in FIG. 3 that the vertical vectors 74 begin at equidistant intervals in the X direction. Because the vertical vectors 74 are evenly spaced in the X direction, the total number N depends on the extent of the silhouette in the X direction. The height of the vectors, i.e., the lengths of the vertical vectors, depends on the distance between the top and the bottom of the silhouette 72 at each X location.

At processing block 34 in FIG. 2, the vertical vectors 74 (FIG. 3) describing the silhouette of the unknown ship 14 (FIG. 1) are adjusted to represent only variations along the top edge of the silhouette, here the superstructure of the unknown ship. At processing block 34, the minimum midship vector 76 (FIG. 3), hereinafter also denoted VN, is identified as the shortest of all vertical vectors (excluding the few vertical vectors, say four percent, on the left side of the image and the few vertical vectors, say four percent, on the right side of the image). All of the vertical vectors are then adjusted by subtracting the magnitude of VN. Each member of the set of adjusted vectors is hereafter denoted U(X). Alternatively, the processing as done at processing block 34 may be omitted and the normalized vertical vectors 74 used in subsequent processing.

At processing block 36 of FIG. 2, the width of the silhouette is normalized by using only every CINT (N/100)th vector where CINT is a function rounding the value in parentheses to the nearest integer. The resulting image will always contain, therefore, 100 vertical vectors. At processing block 38 the height of the vectors is normalized such that the silhouette occupies a predetermined area. The normalization is achieved according to the formula $H(x) = U(X)/(MSV/8)$ where H(X) is the normalized height of vector X,
U(X) is the unnormalized, adjusted height of vector X, and
MSV is the average of the set of adjusted vectors.

At processing blocks 40, 41, and 42, the normalized image of the unknown ship's silhouette is compared to stored silhouettes of known ships. The silhouettes of the known ships are stored before operation in memory 18 in a vectorized, normalized form corresponding to the form of the silhouette to be recognized after passing through processing blocks 30, 32, 34, 36 and 38. Memory 18 contains images for every class of ship the processing can identify. In addition, the memory 18 preferably contains several images for each class, representing the ship viewed from several, here four, different aspects. At processing block 40 one vector of the reference image, i.e., the known silhouette of a particular class of ships, is subtracted from the corresponding vector of the received, normalized and vectorized silhouette. Because the bow of the unknown ship might be at either side of the image, a second difference is computed at processing block 41. At processing block 41, the difference is computed by selecting a reference vector as if the reference image had been formed by a ship headed in the opposite direction, i.e., when the first reference vector is used at processing block 40, the last is used at processing block 41; when the second is used at processing block 40, the second to last is used at processing block 41; and so on. At processing block 42 the absolute values of the differences computed at processing blocks 40 and 41 are accumulated. Decision block 44 causes processing blocks 40, 41, and 42 to be repeated for the next vector in the silhouette of the unknown ship, as determined at processing block 46, until each vector in the received, vectorized, normalized silhouette has been subtracted from the corresponding vector in the reference image then being taken out of the memory 18. The resulting summations of the absolute values of the differences are denoted as the "scores" of the reference image, one for the unknown compared to the reference and the other for the unknown compared to the reference in reverse. At processing block 48 the scores for the reference ship computed at processing blocks 40, 41 and 42 are stored in memory 50. One skilled in the art will recognize that processing block 48 might alternatively process the scores in some way, such as only storing the lowest scores, to reduce the amount of information stored in memory 50. The comparison process is repeated until the silhouette of the unknown ship is compared to each reference image stored in memory 18 as controlled by the loopback path containing processing block 58.

After the silhouette of the unknown ship is compared to all the reference images stored in memory 18, the reference image with the lowest score is selected at processing block 54. The reference ship corresponding to the lowest score "matches" the unknown ship. The processing thus recognizes the unknown ship as belonging to the same class as the selected reference ship. Alternatively, a thresholding function might be employed such that no classification would be assigned to the unknown ship unless the lowest score obtained for all reference silhouettes is lower than some predetermined value.

Radial Vector Embodiment

The foregoing algorithm for identifying objects using vertical vectors is well suited for use on images which have a flat bottom. For example, ships generally appear to have flat bottoms because the portions of the ship below the waterline are not visible. A radial vector algorithm is more suited for use with objects which have structural variations on both their top and bottom edges. For example, airplanes are such objects.

Figure 4:
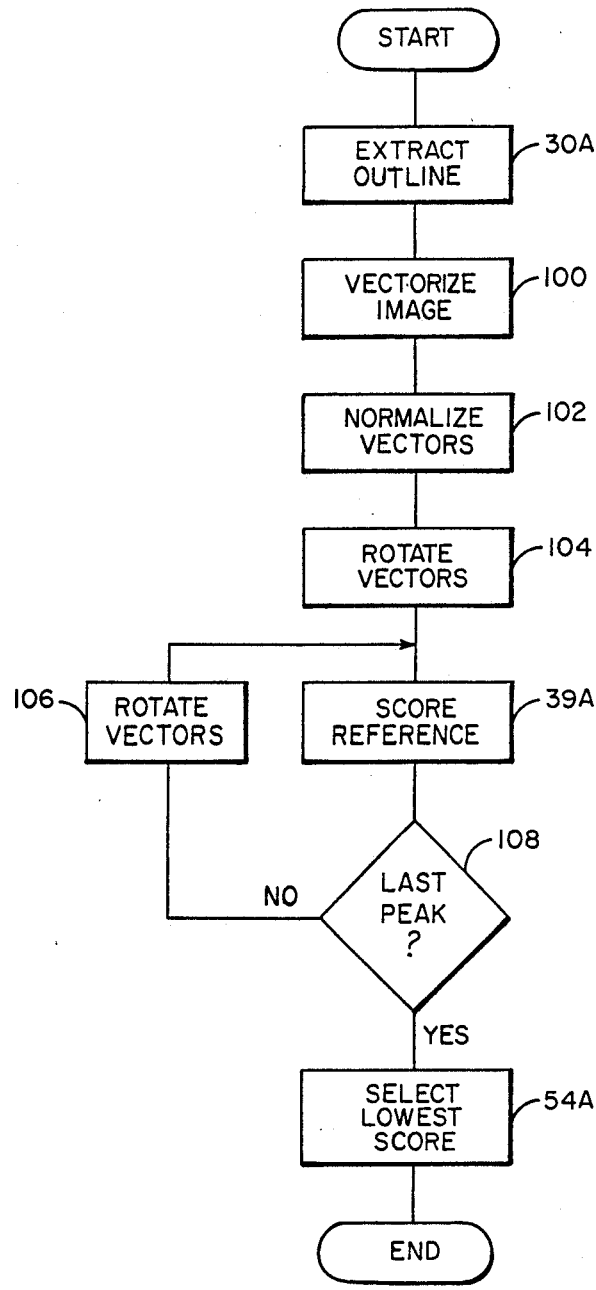
FIG. 4 is a flow chart of an alternative embodiment of the contemplated object identification process.

FIG. 4 shows processing to be performed on images using the radial vector algorithm. Processing block 30A first extracts the outline of the object in the same fashion as processing block 32 (FIG. 2).

Figure 5:
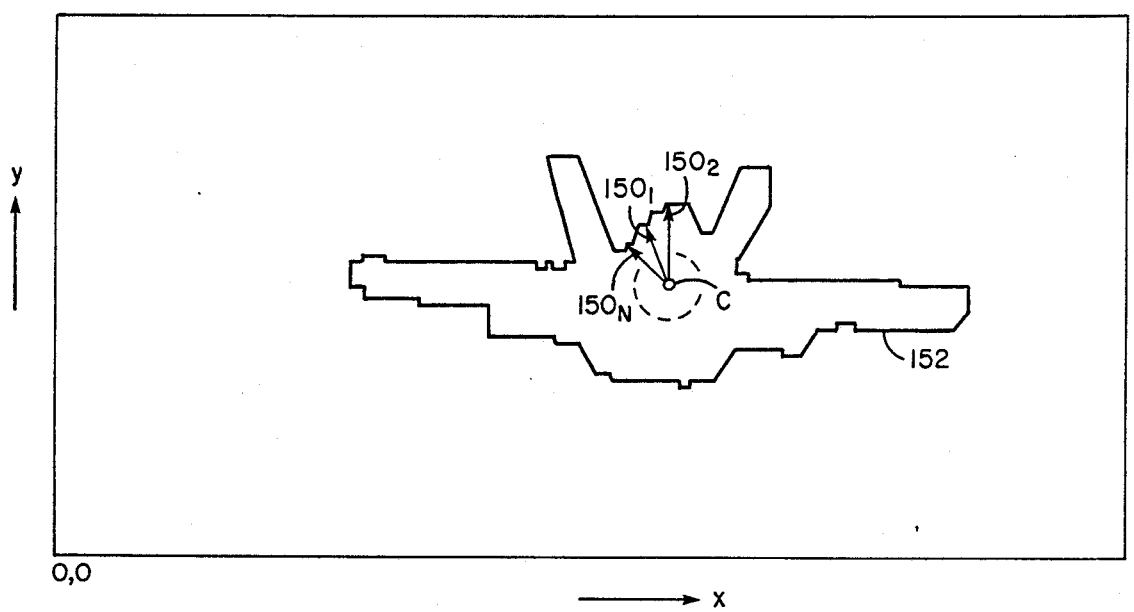
FIG. 5 is a sketch useful in understanding how an image is represented by radial vectors.

Processing block 100 forms radial vectors of the outline according to a method which can be better understood by reference to FIG. 5. FIG. 5 depicts the outline 152 of an unknown aircraft. It should be noted that each point on the outline has an "X" coordinate and a "Y" coordinate. In determining the radial vectors, the centroid, C, of the outline is first computed. Here, a value for the centroid is approximated by averaging the X coordinates and Y coordinates of all points in the outline. Averaging the coordinates yields a value which equals the centroid for symmetrical images. Approximating the centroid by averaging simplifies the required processing and results in vectors which have lengths invariant with the orientation of the object.

Each radial vector has a magnitude reflecting the distance between the centroid C and a point on the outline 152. It is not necessary to compute a radial vector for each point on the outline. A different number, say N, of radial vectors might be computed. To select those N points, a ratio R is computed and is equal to the total number of points on outline 152 divided by N. Here, N has a value of 36, but other values can be used. A first point on outline 152, having a particular X and Y coordinate, is selected. The magnitude of the first radial vector $150_1$ is equal to the square root of the sum of the squared differences between the X and Y coordinates of the point and the centroid C.

A second point on outline 152 is selected as being R points from the first point. Since R is a ratio, it will not always be an integer. Where R is not an integer, the X and Y coordinates of the two points closest to R points from the first point are determined and the coordinates of the second point are determined by interpolating between those values. Based on the interpolated coordinates, a value for the second radial vector $150_2$ is computed.

Values for the rest of the radial vectors $150_3 \ldots 150_N$ are computed in a like manner. Because of processing to normalize the radial vectors described below, any point can be chosen to compute the first radial vector. Likewise, points for computing the successive radial vectors can be taken either clockwise or counterclockwise along outline 152.

Referring again to FIG. 4, the set of radial vectors is normalized at processing block 102. The average of the values of the radial vectors in the set is computed. The average is divided by some constant, say 15, to compute a scale factor. Each of the radial vectors in the set is divided by the scale factor to produce a set of normalized radial vectors.

The normalized vectors are then "rotated" by processing block 104 until the largest vector occupies the first position. For example, if the largest vector is the fifth vector, the set of vectors will be rotated so that the fifth vector becomes the first vector, the sixth vector becomes the second vector, and so on. Additionally, the vectors "wrap around" when rotated so that the fourth vector is rotated to become the last vector, the third vector is rotated to become the second to last vector, and so on. By rotating the vectors, an unknown object will produce the same set of radial vectors regardless of the orientation of the object when the image was made of it.

The radial vectors of the unknown object are compared to images of known objects or references at processing block 39A. Here processing block 39A is like processing block 39 (FIG. 2). The known sets of vectors stored in memory 18, of course, represent aircraft or other objects instead of ships. Additionally, the known sets of vectors are derived from images according to the processing described at processing blocks 30A, 100, 102 and 104 (FIG. 4) rather than according to processing shown in FIG. 2.

Once a score is computed for each reference in memory 18 (FIG. 2), processing proceeds to decision block 108. It will be recalled that comparison to the references was made with the set of radial vectors of the unknown object rotated so that the largest vector is the first vector of the set. The references in memory 18 (FIG. 2) were similarly rotated so that the largest vectors in the sets are compared. If, however, the point on the unknown object giving rise to the largest radial vector does not correspond to the point on the known objects giving rise to the largest radial vector in the references, the comparison will be inexact. For example, noise when the image of the unknown object is formed may cause a radial vector to appear as the largest vector though in the absence of noise some other vector would be the largest.

To reduce the possibility of an inexact comparison, the radial vectors from the unknown images are rotated so that other vectors which are close to the largest are the first radial vector in the set. As seen in FIG. 4, decision block 108 checks for "peaks" in the set of radial vectors. A peak is a radial vector which satisfies several criteria: (i) a peak radial vector is larger than the radial vectors preceding and following it; (ii) the magnitude of a peak radial vector is larger than a first predetermined threshold, say 18; (iii) the magnitude of the peak radial vector must be larger than the radial vector in the preceding "valley" by a second predetermined threshold, say 3 (a valley is a radial vector smaller than the radial vectors preceding and following it); and (iv) the magnitude of the radial vector following the peak is less than the magnitude of the peak radial vector by a predetermined percentage, say 20%.

When decision block 108 identifies another peak in the set of radial vectors, processing proceeds to processing block 106 where the set of vectors is rotated until the peak is the first vector in the set. New scores are then computed at processing block 39A for the rotated set of radial vectors.

When decision block 108 determines that all the peaks in the set have been rotated to the first position, processing proceeds to processing block 54A. Processing block 54A, like processing block 54 (FIG. 2), selects the lowest score computed at processing block 39A. The unknown object is deemed to match the reference set of vectors used to compute that score.

It should be understood by those skilled in the art that various modifications may be made in the present invention without departing from the spirit and scope thereof as described in the specification and defined in the appended claims.

What is claimed is:

1. A method of identifying an unknown object from a digitized image of the silhouette of the object by comparing the digitized image to each one of a plurality of images of the silhouettes of known objects, comprising the steps of:
   (a) representing the digitized image of the silhouette of the unknown object as a set of radial vectors;
   (b) forming a normalized set of radial vectors by dividing each radial vector in the set by a scale factor; and
   (c) rotating the set of radial vectors until the largest radial vector is the first vector in the set.

2. A method of identifying an unknown object as in claim 1 further comprising the steps of:
   (a) comparing the rotated, normalized set of radial vectors to each one of a plurality of normalized, rotated sets of radial vectors representing digitized images of known objects to compute a score for each one of the comparisons, such score equaling the summation of the absolute values of the differences between each radial vector in the unknown normalize rotated silhouettes and the corresponding radial vector in each one of the known normalized, rotated silhouettes.

3. A method of identifying an unknown object as in claim 2 furthering the steps of:
   (a) identifying a peak radial vector in the set of normalized radial vectors;
   (b) rotating set of normalized until the peak radial vector is the first radial vector in the set; and
   (c) comparing the rotated, normalized set of radial vectors to each one of a plurality of normalized, rotated sets of radial vectors representing digitized images of known objects to compute a score for each one of the comparisons, such score equalizing the summation of the absolute values of the differences between each radial vector in the unknown normalized rotated silhouettes and the corresponding radial vector in each one of the known normalized rotated silhouettes.

4. A method of identifying an unknown object as in claim 3 wherein plurality of digitized images representing known objects includes silhouettes formed by airplanes at various aspect angles.

* * * * *